(12) United States Patent
Watson

(10) Patent No.: US 7,565,377 B2
(45) Date of Patent: Jul. 21, 2009

(54) ARTIFICIALLY INTELLIGENT FULFILLMENT SYSTEM

(76) Inventor: Robert Michael Watson, 2824 N. Buena Vista, Burbank, CA (US) 91504

( * ) Notice: Subject to any disclaimer, the term of this patent is extended or adjusted under 35 U.S.C. 154(b) by 54 days.

(21) Appl. No.: 10/313,336

(22) Filed: Dec. 6, 2002

(65) Prior Publication Data
US 2004/0034542 A1 Feb. 19, 2004

Related U.S. Application Data

(60) Provisional application No. 60/339,959, filed on Dec. 5, 2001, provisional application No. 60/341,147, filed on Dec. 14, 2001, provisional application No. 60/355,743, filed on Feb. 5, 2002.

(51) Int. Cl.
*G06F 17/30* (2006.01)
(52) U.S. Cl. .................. 707/104.1; 707/2; 707/5; 707/6; 715/201; 715/210
(58) Field of Classification Search ............ 707/6, 707/100, 101, 102, 103 R, 104.1, 2, 5; 706/45; 705/35, 14, 1; 709/224; 704/239, 243; 715/201, 715/210
See application file for complete search history.

(56) References Cited

U.S. PATENT DOCUMENTS

| | | | |
|---|---|---|---|
| 5,164,897 A | 11/1992 | Clark et al. | |
| 5,197,004 A | 3/1993 | Sobotka et al. | |
| 5,283,731 A | 2/1994 | Lalonde et al. | |
| 5,283,894 A * | 2/1994 | Deran | 707/1 |
| 5,363,473 A | 11/1994 | Stolfo et al. | |
| 5,379,366 A * | 1/1995 | Noyes | 706/55 |
| 5,398,300 A | 3/1995 | Levy | |
| 5,416,694 A | 5/1995 | Parrish et al. | |
| 5,455,890 A | 10/1995 | Wang | |
| 5,481,647 A | 1/1996 | Brody et al. | |
| 5,724,521 A | 3/1998 | Dedrick | |
| 5,765,028 A | 6/1998 | Gladden | |
| 5,832,497 A | 11/1998 | Taylor | |
| 5,875,441 A | 2/1999 | Nakatsuyama | |
| 5,884,270 A | 3/1999 | Walker et al. | |
| 6,049,776 A | 4/2000 | Donnelly et al. | |
| 6,076,088 A * | 6/2000 | Paik et al. | 707/5 |
| 6,182,050 B1 | 1/2001 | Ballard | |
| 6,266,659 B1 | 7/2001 | Nadkarni | |
| 6,272,467 B1 | 8/2001 | Durand et al. | |
| 6,289,340 B1 | 9/2001 | Puram et al. | |

(Continued)

FOREIGN PATENT DOCUMENTS

EP  1083504 A2 *  3/2001

(Continued)

*Primary Examiner*—Shahid A Alam
(74) *Attorney, Agent, or Firm*—James A. Italia; Italia IP

(57) ABSTRACT

An artificially intelligent system comprising a plurality of autonomous virtual machines, anonymously matching advertisements over a publicly accessible electronic network. The system automates matching of free form electronic documents for supply and demand of goods or services. Each machine employs an expert system with a geographical bias, an inherent learning capability, and tendency to improve accuracy over time. Advertisements and knowledge bases are replicated to identically configured networked machines. Each machine elicits a qualified, interactive response to an advertisement, employing electronic commerce in the purchase of contact information for a supplier, by a demander.

25 Claims, 3 Drawing Sheets

U.S. PATENT DOCUMENTS

Figure 1:
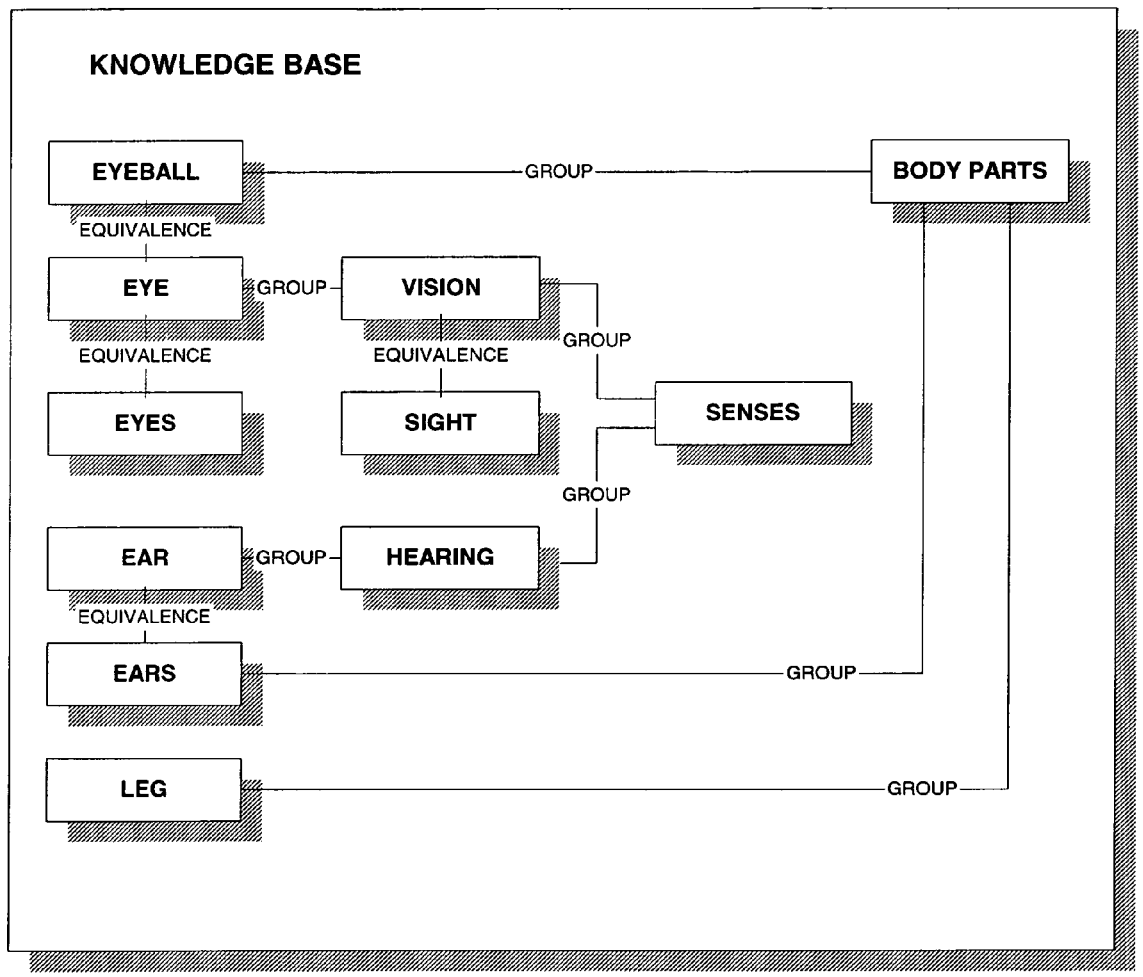

| | | |
|---|---|---|
| 6,324,534 B1 | 11/2001 | Neal et al. |
| 6,374,261 B1 | 4/2002 | Alvarez |
| 6,389,405 B1 | 5/2002 | Oatman et al. |
| 6,587,846 B1 | 7/2003 | LaMuth |
| 6,604,141 B1 | 8/2003 | Ventura |
| 6,727,927 B1 * | 4/2004 | Dempski et al. ............ 715/853 |
| 6,850,923 B1 | 2/2005 | Nakisa et al. |
| 6,868,525 B1 * | 3/2005 | Szabo ........................ 715/738 |
| 6,934,696 B1 | 8/2005 | Williams et al. |
| 7,181,438 B1 * | 2/2007 | Szabo ........................... 707/2 |
| 7,212,985 B2 | 5/2007 | Sciuk |
| 7,233,934 B1 | 6/2007 | Oggerino et al. |
| 7,302,466 B1 | 11/2007 | Satapathy et al. |
| 7,315,826 B1 * | 1/2008 | Guheen et al. ................. 705/7 |
| 2001/0014868 A1 * | 8/2001 | Herz et al. .................... 705/14 |
| 2001/0042000 A1 | 11/2001 | Defoor |
| 2002/0023042 A1 * | 2/2002 | Solomon ..................... 705/37 |
| 2002/0029267 A1 * | 3/2002 | Sankuratripati et al. ..... 709/224 |
| 2002/0032602 A1 * | 3/2002 | Lanzillo et al. ............... 705/14 |

FOREIGN PATENT DOCUMENTS

| | | |
|---|---|---|
| WO | WO 01/09772 A1 | 2/2001 |
| WO | WO 01/25987 A1 | 4/2001 |
| WO | WO 01/88781 A2 | 11/2001 |

* cited by examiner

ARTIFICIALLY INTELLIGENT FULFILLMENT SYSTEM

REFERENCES CITED

Reference to Related Applications

The present application claims the priority of the following provisional applications, incorporated herein by reference:

PPA No. 60/339,959 entitled "Internet based, virtual machine utilizing artificial intelligence to locate resources by geographic location", filed Dec. 5, 2001.

PPA No. 60/341,147 entitled "Artificially intelligent fulfillment system", filed Dec. 14, 2001.

PPA No. 60/355,743 entitled "Internal processing of artificially intelligent fulfillment system", filed Feb. 5, 2002.

SEQUENCE LISTING OR PROGRAM

A complete list of the source code required to create the hierarchical database is contained in the CD-ROM provided, entitled "AIFS source code—May 12, 2002". The CD_ROM is incorporated here by reference, see Appendix A for contents.

BACKGROUND

1. Field of the Invention

The invention generally relates to the field of intelligent document storage and retrieval. More specifically the system, through a plurality of algorithms, engages at least one expert system, to retrieve and qualify electronic records (or profiles) describing surplus (or supply), containing known, and previously unknown, words or phrases (or patterns) in free form text, of relative significance or strength, in relation to the significant patterns in free form text, in records describing demand. The relative score between a supply and demand profile obtained by factoring a plurality of supply pattern to a plurality of demand pattern, with reference to a knowledge base (or expert system), is the basis for qualification and ranking.

Further, the system relates to the field of interactive advertising. A plurality of algorithms determines the availability of a supply or demand, on a personal match list for the owner of a particular supply or demand, for a particular knowledge base. Such match list, deliverable in electronic form, enables the owner of a profile, to interact with ranked supply or demand profiles: access to detailed descriptive information in a plurality of electronic media formats; update a plurality of indicators visible to owner of profile; transmission of an electronic message to the owner of the profile.

2. Prior Art

Third-party services generally provide supply to meet demand on a per-item commission basis. Fees are generally paid by demander, in arrears and often subject to qualification, or engagement of that supply for a probationary period. Other services may be provided, such as background checks, and references. Pricing varies according to the need of the Demander.

Advertisement of a demand via newspaper or trade press also provides less than optimal performance, as it will not ensure that the supply accurately meets the demand. Suppliers tend to respond in terms of their need and not necessarily that of the demander. Fees are paid in advance by demander, irrespective of the results. Pricing is based on the physical restrictions of the publishing and distribution process, such as lineage or relative page size, often combined with an advertising credit system.

Other services currently available, such as online search databases, whilst easily accessible, are often taxonomical in operation, resulting in information loss as free form text is reduced to categories, keywords, or Boolean data. Taxonomical systems often depend on the experience of the designer in providing sufficient options for categorization. As a result they are difficult to operate with user performing the search having to second guess the particular taxonomy used by the originator of a profile. Prices are often based on the quantity of the return.

OBJECTS AND ADVANTAGES

The invention provides a novel alternative to the above described traditional methods of advertising: possessing the advantage of in-built intelligence with a learning capability; eliciting a qualified response; and providing dynamic control of the advertising costs associated with fulfillment. The system is programmed to record patterns in documents submitted in the context of a particular expert system, in a hierarchical database; to learn from interaction; to qualify and rank supply and demand; provide interactive feedback; and deliver services electronically.

In the course of submitting a profile an electronic document may be submitted in a coded format. The system performs reduction of the document to a common format, as a pre-requisite of the expert system to be used. Such documents are assigned a plurality of previously identified words, phrases or patterns by the expert system, from existing hierarchical relationships in the knowledge base. The expert operators define and record the relationships between newly encountered patterns and patterns in the expert system in use; and may modify existing relationships to accommodate; providing a learning capability tending to increase accuracy.

The creator of a demand or supply profile reviews a list of matched profiles. The supplier must be pre-qualified by the expert system, in order to be placed on a list of matching supply for a particular demand profile. This assures that the list of suppliers meets the minimum requirements of demander; the system provides qualified matching.

Suppliers may only respond to a demand profile on their match list, to indicate an interest in fulfilling the demand; the system provides qualified response.

The demander, after having reviewed matched profiles, including response of the matching supplier profile owners may receive supplier contact information for a fee; fees are paid to the operator of the machine, for the results of the search for identity (or contact information) for one or more matching profiles, as required of the demander. The system introduces no bias, for or against the supplier, since they create their own profile for free, and cannot contact demanders.

SUMMARY

The invention provides intelligent matching of free form text; supply and demand documents, employing at least one expert system, incorporating a learning capability tending to increase the efficiency of the matching process over time.

DRAWINGS

FIG. 1: Illustrates the group and equivalence relationships, and keys (words, phrases or patterns) that may be used to index input documents. Equivalent associations are shown vertically and group associations left to right. Once a key is recognized, the number of group levels traversed to reach another key, from the original key, determines the level of association with the other key. A group association may originate from the original key or any of the equivalence keys. For example: the key "Eyeball" has level 1 association with "Eye" and "Eyes", level 2 association with "Vision", "Sight" and "Body Parts", and level 3 association with "Senses".

Figure 2:
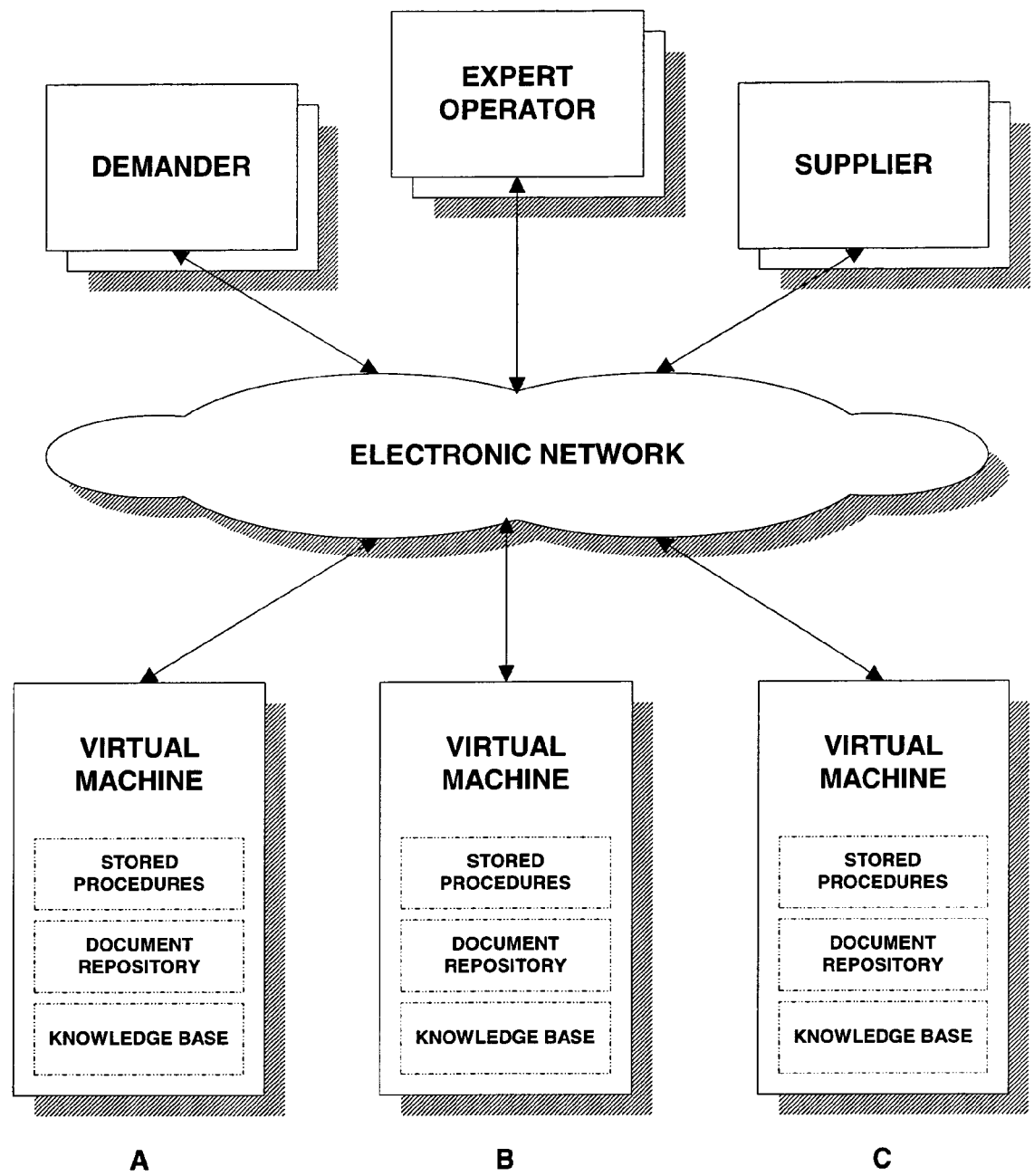

FIG. 2: Illustrates the publicly accessible electronic network, which connects, suppliers, demanders, and expert operators with the virtual machines. The machines labeled A, B, and C, represent three identically configured machines, sharing data comprising: documents and knowledge base.

Figure 3:
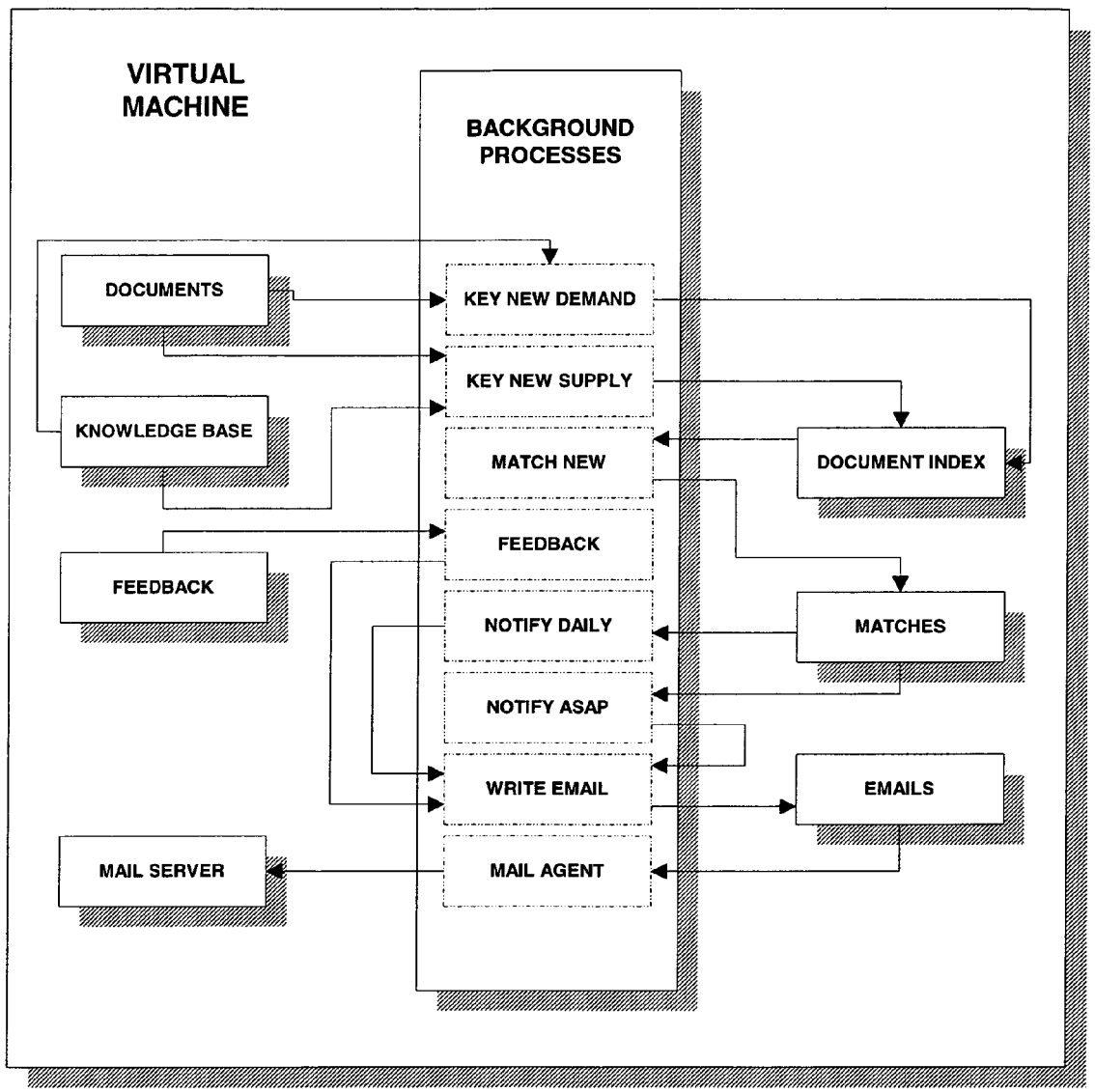

FIG. 3: Illustrates how the background processes interact with the system. Each process operates autonomously on an arbitrary periodic schedule.

DETAILED DESCRIPTION

1. Preferred Embodiment

1.1. Description

This embodiment employs: a plurality of database (supply and demand) with a corresponding expert system, in tandem, to provide a plurality of intelligent searches capabilities; independence from electronic document encoding; and independence from document structure or layout.

The system is computerized, comprising a CPU and a hierarchical database wherein is stored the document repository, supply and demand profiles, indexing, matching and transactional data, stored procedures, and a plurality of expert system data.

The architecture of the computer system can be described in terms of the components:

Firewall—a device for securing an internal network from external access, except as required for operation of the invention, as configured by a person skilled in Network Administration. The purpose of the firewall is to permit communication with users on an electronic network.

Web server—a device for delivering electronic forms, static and dynamic web pages, and performing procedure calls to the application server, as configured by a person skilled in Web Administration. The purpose of the web server is to respond to requests by users over an electronic network.

Application server—a device for performing the programmatic algorithms of the application, controlling access to data, accessing the hierarchical database on the database server, as configured by an Applications Administrator. The purpose of the application server is to perform programmatic algorithms in response to: user input via the Web Server; a periodic schedule for autonomous background processes.

Database server—a device for storing and retrieving hierarchical data, as configured by a Database administrator. The database server is a repository for the supply and demand data, including any references to external data, indexing data, matching data, stored procedures, and the patterns and relationships comprising the expert system.

Mail server (or MTA)—a device for relaying electronic messages, configured by a Systems Administrator. The mail server relays electronic messages and acts as an interface to the application by responding with programmatic algorithms for some incoming addresses.

1.2 Operation

Users submit a profile via electronic form, which consists of a number of free form text fields and a mechanism for uploading a document electronically. In return they receive a login and password via electronic message. An electronic record of the match list for their demand or supply profile is created in the hierarchical database. The electronic form comprising a representation of that match list (or match page), is dynamically updated with status information. An electronic message is sent to the user periodically via email, containing a hypertext link to the match list. The profile owner for the match list must provide a valid user name and password to view and interact with the match list.

A dynamic match page displays the list, with reference to the current matches recorded in the hierarchical database, including a plurality of devices for navigating and otherwise interacting with the list, user may:
    view and download profile information;
    request profiles via electronic messaging;
    provide feedback on interest in a match;

additionally, demander may:
    purchase supplier identity;
    send a request for feedback to supplier.

A user creating a supply sees a current list of demand (matched and ranked by the system), and vice versa. Demanders may contact suppliers by purchasing their contact information, via electronic commerce, and downloading electronically.

A number of autonomous background processes provide necessary supporting functions, see FIG. 3:

Write Email—periodically, transfer email messages from the hierarchical database to the file system for subsequent processing by the "Mail Agent" as described below; record in the hierarchical database.

Mail Agent—periodically, read email messages from file system and send to the Mail Server (as described in 1.1 above), for delivery.

Key New Demand—periodically, read newly approved demand profiles and index with reference to the expert system; record in the hierarchical database.

Key New Supply—periodically, read newly approved supply profiles and index with reference to the expert system; record in the hierarchical database.

Match New—periodically, read newly indexed demand profiles and iteratively match new supply profiles, according to the recorded indices; record in the hierarchical database.

Feedback—periodically, read request by users (demand and supply profile owners) for delivery of selected matching profile. Create an email record in the hierarchical database to be serviced by the "Write Mail" process, described above.

Notify Daily—daily, notify profile owners with new matches recorded in the hierarchical database. Create an email record in the hierarchical database to be serviced by the "Write Mail" process, described above.

Notify ASAP—periodically, notify profile owners with new matches recorded in the hierarchical database. Create an email record in the hierarchical database to be serviced by the "Write Mail" process, described above.

A number of supporting functions are available to a user (the creator of a demand or supply profile), via a menu system, implemented in the electronic interface of the application server, to support electronic commerce, provide account history, and auditing, profile options, settings and preferences. It is anticipated that the user functions will evolve, to accommodate ancillary functions.

A number of supporting functions are available to the administrator including: the approval or denial of submitted profiles; a plurality of statistical functions pertaining to financial and other activities; updates and corrections to the expert system patterns and relationships; modification of system level parameters; periodic requests for re-indexing of profiles; updates to Frequently Asked Questions database; updates to electronic mail templates. It is anticipated that the administrator functions will evolve, to accommodate further ancillary functions.

A menu is available to an expert operator including: listing of the expert system relationships; visual identification of new patterns in a new document where recognized patterns are highlighted; update of the expert system patterns and relationships. It is anticipated that the expert operator menu will evolve, to accommodate ancillary functions.

The machine replicates data to multiple hierarchical databases. Identically configured machines exchange information. Each machine electively receives and transmits documents and knowledge-base data to other machines connected electronically using replication techniques widely accepted in data processing, see FIG. 2.

1.2.1 Detailed Operation of the Invention 1.2.1.1 Parameters a) System Parameters
  i) Indexing level (SIL)
    This parameter determines the number of levels of group associations to traverse when indexing profiles. Words in the knowledge base, or keys, are parsed for associations recorded in the hierarchical database, which can be either equivalence (at the same level), or group (at a higher level).
    Both group and equivalence key associations are traversed when indexing a profile to determine which keys to record for the profile in the hierarchical database. The level of association, is also recorded, see FIG. 1.
    If the SIL is unity then the first set of equivalent keys are traversed. If the SIL is 2, additionally the first level group keys and their equivalence keys are recorded, and so on.
  ii) Matching Level (SML)
    This parameter controls the operation of the matching process in determining the number of levels of group associations to include in formulating a score for a profile at the time of matching, with reference to the association level recorded for a profile key, in the hierarchical database at the time of indexing, see 1.2.1.1(a) (i).
    During the matching process the matching level used for a match is the SML. The matching level and score are recorded for a match in the hierarchical database.
  iii) System Threshold (ST)
    The system threshold determines the lower limit for matching profiles and controls the information displayed to the originator of a matched profile. This may either be the lower bound for a match score or a count of the number of the highest ranked matching profiles.

1.2.1.2 Profile Indexing

A profile comprises of a plurality of free form text fields and at least one descriptive document, incorporating personal information from the originator and specific information for the supply or demand.
  a) Create a temporary word list for the profile from the title, and the descriptive documents, along with the frequency, and origin of the words. The origin may be: title, descriptive document, or both.
  b) For each word recorded in 1.2.1.2(a), if the word does not match a key, record in the knowledge base as unclassified.
  c) For each word recorded in 1.2.1.2(a), if the word matches a key in the knowledge base and the word is not an unclassified or meaningless word, record frequency and origin in the hierarchical database for the profile. Origin may be: title, descriptive document, or both.
  d) Existing multi-word keys in the knowledge base are compared with the temporary word list created in 1.2.1.2 (a), and the multi-word key and frequency recorded in the hierarchical database, for the profile.
  e) Depending on the SIL, existing equivalence keys are compared with the temporary word list created in 1.2.1.2 (a) and multi-word keys created in 1.2.1.2(d), and the equivalence key together with the original frequency are recorded in the hierarchical database for the profile, as described in 1.2.1.1(a)(i).
  f) Depending on the SIL, existing group associations for the each of the keys, recorded for the profile, are traversed and the new group and associated equivalence keys together with original frequency and origin are recorded in the hierarchical database for the profile, as described in 1.2.1.1(a)(i).

1.2.1.3 Expert operation

At least one expert operators updates the knowledge base classifying new words to create keys; indicate required keys; create new multi-word keys; and new key associations. Key associations may be created as equivalent (same level) or group (higher level), see FIG. 1.

1.2.1.4 Profile Matching

Compare each active supply to each active demand and formulate the component match scores, as follows:
  a) Required Keys
    All keys for a profile, recorded in the knowledge base as required, are compared. The matching level is determined by the SML as described in 1.2.1.1(a)(ii). Only those profile keys with an index level less than or equal to the matching level are including in the matching process:

Component Score=number of required keys in supply/number of required keys in demand Where there are no required keys recorded for the demand score as unity.
  b) Keys
    All keys for a profile are compared. The matching level is determined by the SML as described in 1.2.1.1(a)(ii). Only those profile keys with an index level less than or equal to the matching level are including in the matching process:
    For each key recorded for the demand profile, score the key as:

Key Score=frequency in supply/frequency in demand

Where this is greater than unity, score as unity. The component score is calculated as:

Component Score=sum of Key Score/number of demand keys.
  c) Title
    Keys that occur only in the title are compared. The matching level is determined by the SML as described in 1.2.1.1(a)(ii). Only those profile keys with an index level less than or equal to the matching level are including in the matching process:

For each key recorded for the demand profile with an origin of title, score the key as:

Title Key Score=frequency in supply title/frequency in demand title

Where this is greater than unity score as unity. The component score is calculated as:

Component Score=sum of Title Key Score/number of demand title keys.

d) Category

Each key in the knowledge base is associated with a plurality of categories, one of which is a primary category. Compare the frequency of the primary key categories for the supply to the frequency for the demand:

Individual Score=frequency in supply keys/frequency in demand keys

Where this is greater than unity score as unity. The component score is calculated as:

Component Score=sum of Individual Scores/number of demand key categories.

e) Type

Compare the supply type to the demand type and return an arbitrary score between zero and unity.

f) Location

Compare the Country, City, State and Zip (Postal) Code from the supply to the demand and return an arbitrary score between zero and unity.

g) Citizen/Resident/Travel

Compare the Citizenship, Residency and Travel preference indicators for the supply to the demand and return an arbitrary score between zero and unity.

h) Relocation

Compare the Relocation preference indicator for the supply to the demand and return an arbitrary score between zero and unity.

i) Pricing

Compare the Price upper and lower limits for the supply to the demand and return an arbitrary score between zero and unity.

j) Experience

Compare the Experience for the supply to the demand and return an arbitrary score between zero and unity.

Depending on the demand/supply type, apply an individual, arbitrary weighting to each of the component scores, to give a weighted component score. Multiply together each of the weighted components, and convert to a decimal percentage. Record the score, and matching level for the matching supply and demand profiles in the hierarchical database.

1.2.1.5 Match Display

The ST is used to determine the profiles displayed as matching, as described in 1.2.1.1(a)(iii) and 1.2.1.1(b) (ii).

2. Alternate Embodiment 2.1 Description

The alternate embodiment is the application of the invention to recruiting or head-hunting for Information Technology personnel, where the patterns are skills in word or phrase form. The expert system uses American English words or phrases (or patterns) and reduces source documents to decoded American English (ASCII) text, for indexing and matching. The accompanying CD-ROM contains the source code for construction of the database; seeding of data; stored procedures, functions and scripts for operation.

2.2 Operation

In this embodiment the supply is Information Technology personnel, with skills representing the patterns. The demand is Information Technology jobs. Suppliers submit their candidate profile, containing geographic location, compensation requirements and descriptive document (a resume), electronically. Demanders submit a job profile in a similar manner and upload a descriptive document (a job description), electronically.

New patterns are identified by expert operators and added to the expert system (skill database) together with hierarchical relationships. This relative number of hops, measure in equivalence (zero hops) or group (one hop) between the source and destination skill in the expert system, along with the user, and system preferences, determine the relative strength of the match, or score.

As described here and in the preferred embodiment the invention analyzes data as submitted. That is, the data is wholly contained within a hierarchical database, as data submitted via electronic medium to the invention, in the form of a supply or demand profile. However, this is not a necessary feature of the invention. All that is required is access to the source data for reading. Therefore, all functions, described herein may be performed on data that is externally accessible containing, at minimum, a free form text descriptive document. This would include external repository that may be parsed, such as a URL.

APPENDIX A

CD-ROM Contents

All assumptions are included as comments in the source code. The source code is written is in the PL/SQL and SQL*PLUS proprietary programming languages of Oracle Corporation, and Unix Korn shell script, and contains all necessary components to install and operate the alternate embodiment of the invention, as described below.

```
CD-ROM DISK Label: COPY 1
Directory of E:\
README       TXT              1,240   04-14-03 3:47p
                                      README.TXT
SCRIPTS            <DIR>              04-14-03 3:47p scripts
SQL                <DIR>              04-14-03 3:47p sql
STATIC             <DIR>              04-14-03 3:47p static
              1 file(s)                 1,240 bytes
Directory of E:\scripts
.                  <DIR>              04-14-03 3:47p .
..                 <DIR>              04-14-03 3:47p ..
SDCEMAIL     SH                 996   12-05-02 2:30p sdcemail.sh
              1 file(s)                   996 bytes
Directory of E:\sql
.                  <DIR>              04-14-03 3:47p .
..                 <DIR>              04-14-03 3:47p ..
CRADMIN      SQL             41,763   12-05-02 2:28p cradmin.sql
CRCART       SQL             10,129   12-05-02 2:28p crcart.sql
CRDAT        SQL             13,101   12-05-02 2:28p crdat.sql
CRENT        SQL              8,538   12-05-02 2:28p crent.sql
CRFB         SQL             89,470   12-05-02 2:28p crfb.sql
CRFUNC       SQL              1,483   12-05-02 2:28p crfunc.sql
CRGEN        SQL             34,899   12-05-02 2:28p crgen.sql
CRJOB        SQL             43,648   12-05-02 2:28p crjob.sql
CRMAINT      SQL            130,639   12-05-02 2:28p crmaint.sql
CBMATCH      SQL             93,355   12-05-02 2:28p crmatch.sql
CRREP        SQL             24,590   12-05-02 2:28p crrep.sql
CRSDCF       SQL             95,414   12-05-02 2:28p crsdcf.sql
CRSDCX       SQL             37,351   12-05-02 2:28p crsdcx.sql
```

-continued

| | | | |
|---|---|---|---|
| CRSEL | SQL | 6,294 | 12-05-02 2:28p crsel.sql |
| CRTAB | SQL | 49,280 | 12-05-02 2:28p crtab.sql |
| 15 file(s) | | 679,954 bytes | |

Directory of E:\static

| | | | |
|---|---|---|---|
| . | <DIR> | | 04-14-03 3:47p . |
| .. | <DIR> | | 04-14-03 3:47p .. |
| BUY_QU~6 | HTM | 908 | 12-05-02 2:32p buy_quota.html |
| CAND_M~8 | HTM | 998 | 12-05-02 2:32p cand_mlist.html |
| CC_EN~10 | HTM | 996 | 12-05-02 2:32p cc_entry.html |
| FAQ | HTM | 933 | 12-05-02 2:32p faq.htm |
| INDEX~14 | HTM | 3,560 | 12-05-02 2:32p index.html |
| JOB_M~16 | HTM | 996 | 12-05-02 2:32p job_mlist.html |
| LINKS~18 | HTM | 998 | 12-05-02 2:32p links.html |
| MAIN~20 | HTM | 5,033 | 12-05-02 2:32p main.html |
| MYSDC~22 | HTM | 996 | 12-05-02 2:32p mysdc.html |
| QSCAN~24 | HTM | 1,005 | 12-05-02 2:32p qscand.html |
| QSCHELP | HTM | 2,521 | 12-05-02 2:32p qschelp.htm |
| QSJHELP | HTM | 2,515 | 12-05-02 2:32p qsjhelp.htm |
| QSJOB~30 | HTM | 1,005 | 12-05-02 2:32p qsjob.html |
| REFER~32 | HTM | 997 | 12-05-02 2:32p refer.html |
| REFS2~34 | HTM | 4,023 | 12-05-02 2:32p refs2x.html |
| SDCLEGAL | HTM | 9,000 | 12-05-02 2:32p sdc-legal.htm |
| SDCLO~38 | HTM | 997 | 12-05-02 2:32p sdc-login.html |
| SDCLO~40 | HTM | 2,282 | 12-05-02 2:32p sdc-logo.html |
| SDCPJ~42 | HTM | 16,996 | 12-05-02 2:32p sdcpj1.html |
| SDCPJ~44 | HTM | 984 | 12-05-02 2:32p sdcpjx.html |
| SDCRE~46 | HTM | 14,084 | 12-05-02 2:32p sdc-req1.html |
| SDCRE~48 | HTM | 985 | 12-05-02 2:32p sdc-reqx.html |
| TIPS__~50 | HTM | 6,001 | 12-05-02 2:32p tips_for_candidates.htm |
| TIPS__~52 | HTM | 6,623 | 12-05-02 2:33p tips_for_employers.htm |
| 24 file(s) | | 85,436 bytes | |

Total files listed:
41 file(s)    767,626 bytes
9 dir(s)      0 bytes free

CD-ROM DISK Label: COPY 2
Directory of E:\

| | | | |
|---|---|---|---|
| README | TXT | 1,240 | 04-14-03 3:47p README.TXT |
| SCRIPTS | <DIR> | | 04-14-03 3:47p scripts |
| SQL | <DIR> | | 04-14-03 3:47p sql |
| STATIC | <DIR> | | 04-14-03 3:47p static |
| 1 file(s) | | 1,240 bytes | |

Directory of E:\scripts

| | | | |
|---|---|---|---|
| . | <DIR> | | 04-14-03 3:47p . |
| .. | <DIR> | | 04-14-03 3:47p .. |
| SDCEMAIL | SH | 996 | 12-05-02 2:30p sdcemail.sh |
| 1 file(s) | | 996 bytes | |

Directory of E:\sql

| | | | |
|---|---|---|---|
| . | <DIR> | | 04-14-03 3:47p . |
| .. | <DIR> | | 04-14-03 3:47p .. |
| CRADMIN | SQL | 41,763 | 12-05-02 2:28p cradmin.sql |
| CRCART | SQL | 10,129 | 12-05-02 2:28p crcart.sql |
| CRDAT | SQL | 13,101 | 12-05-02 2:28p crdat.sql |
| CRENT | SQL | 8,538 | 12-05-02 2:28p crent.sql |
| CRFB | SQL | 89,470 | 12-05-02 2:28p crfb.sql |
| CRFUNC | SQL | 1,483 | 12-05-02 2:28p crfunc.sql |
| CRGEN | SQL | 34,899 | 12-05-02 2:28p crgen.sql |
| CRJOB | SQL | 43,648 | 12-05-02 2:28p crjob.sql |
| CRMAINT | SQL | 130,639 | 12-05-02 2:28p crmaint.sql |
| CRMATCH | SQL | 93,355 | 12-05-02 2:28p crmatch.sql |
| CRREP | SQL | 24,590 | 12-05-02 2:28p crrep.sql |
| CRSDCF | SQL | 95,414 | 12-05-02 2:28p crsdcf.sql |
| CRSDCX | SQL | 37,351 | 12-05-02 2:28p crsdcx.sql |
| CRSEL | SQL | 6,294 | 12-05-02 2:28p crsel.sql |
| CRTAB | SQL | 49,280 | 12-05-02 2:28p crtab.sql |
| 15 file(s) | | 679,954 bytes | |

Directory of E:\static

| | | | |
|---|---|---|---|
| . | <DIR> | | 04-14-03 3:47p |
| .. | <DIR> | | 04-14-03 3:47p |
| BUY_QU~6 | HTM | 908 | 12-05-02 2:32p buy_quota.html |
| CAND_M~8 | HTM | 998 | 12-05-02 2:32p cand_mlist.html |
| CC_EN~10 | HTM | 996 | 12-05-02 2:32p cc_entry.html |
| FAQ | HTM | 933 | 12-05-02 2:32p faq.htm |
| INDEX~14 | HTM | 3,560 | 12-05-02 2:32p index.html |
| JOB_M~16 | HTM | 996 | 12-05-02 2:32p job_mlist.html |
| LINKS~18 | HTM | 998 | 12-05-02 2:32p links.html |
| MAIN~20 | HTM | 5,033 | 12-05-02 2:32p main.html |
| MYSDC~22 | HTM | 996 | 12-05-02 2:32p mysdc.html |
| QSCAN~24 | HTM | 1,005 | 12-05-02 2:32p qscand.html |
| QSCHELP | HTM | 2,521 | 12-05-02 2:32p qschelp.htm |
| QSJHELP | HTM | 2,515 | 12-05-02 2:32p qsjhelp.htm |
| QSJOB~30 | HTM | 1,005 | 12-05-02 2:32p qsjob.html |
| REFER~32 | HTM | 997 | 12-05-02 2:32p refer.html |
| REFS2~34 | HTM | 4,023 | 12-05-02 2:32p refs2x.html |
| SDCLEGAL | HTM | 9,000 | 12-05-02 2:32p sdc-legal.htm |
| SDCLO~38 | HTM | 997 | 12-05-02 2:32p sdc-login.html |
| SDCLO~40 | HTM | 2,282 | 12-05-02 2:32p sdc-logo.html |
| SDCPJ~42 | HTM | 16,996 | 12-05-02 2:32p sdcpj1.html |
| SDCPJ~44 | HTM | 984 | 12-05-02 2:32p sdcpjx.html |
| SDCRE~46 | HTM | 14,084 | 12-05-02 2:32p sdc-req1.html |
| SDCRE~48 | HTM | 985 | 12-05-02 2:32p sdc-reqx.html |
| TIPS__~50 | HTM | 6,001 | 12-05-02 2:32p tips_for_candidates.htm |
| TIPS__~52 | HTM | 6,623 | 12-05-02 2:33p tips_for_employers.htm |
| 24 file(s) | | 85,436 bytes | |

Total files listed:
41 file(s)    767,626 bytes
9 dir(s)      0 bytes free

What is claimed is:

1. A computer-implemented method for matching documents of a supplier and demander, the method comprising the steps of:
    (a) inputting a document by a supplier, wherein the document includes the supplier's profile information and contact information;
    (b) inputting a document by a demander, wherein the document includes the demander's profile information and contact;
    (c) extracting the supplier's and demander's profile information in said inputted documents to a commonly formatted document record for indexing purposes;
    (d) indexing the supplier and demander commonly formatted document records, thereby creating an indexed electronic record of the initially inputted supplier and demander documents;
    (e) comparing a supplier indexed electronic record to a demander indexed electronic record, thereby generating a score for each electronic document relative to the electronic document it was compared with;
    (f) matching a supplier indexed electronic record to a demander indexed electronic record, such that supplier and demander indexed electronic documents with the most common words or phrases contained therein are matched together;
    (g) displaying a match list, wherein the match list is comprised of matched indexed electronic records of a supplier or demander, wherein suppliers are matched to a given demander and demanders are matched to a given supplier; and (h) allowing a supplier or demander to view the contents of the indexed electronic records contained in said match list.

2. The method of claim 1, wherein the step of indexing the supplier and demander commonly formatted document records to create an indexed electronic record, is a human expert operator that categorizes new words or phrases in the document record with known words or phrases stored in a hierarchal database.

3. The method claim 2, further comprising the step of adding said new words or phrases categorized by the human expert operator to a hierarchal database of words or phrases, thereby creating new hierarchal relationships in the hierarchal database.

4. The method of claim 1, wherein the step of indexing the supplier and demander commonly formatted document records to create an indexed electronic record, is a hierarchal database that stores categories of known words or phrases and compares them to the known words or phrases in the document record.

5. The method of claim 1, wherein the step of indexing the supplier and demander commonly formatted document records to create an indexed electronic record comprises:
a human expert operator that categorizes new words or phrases in the document record with known words or phrases stored in a hierarchal database; and
a hierarchal database that stores categories of known words or phrases and compares them to the known words or phrases in the document record.

6. The method claim 5, further comprising the step of adding said new words or phrases categorized by the human expert operator to said hierarchal, thereby creating new hierarchal relationships in the hierarchal database.

7. The method of claim 1, wherein the step of matching a supplier indexed electronic record to a demander indexed electronic record is scoring dependent, such that supplier and demander indexed electronic documents with the most common words or phrases contained therein receive the highest scores.

8. The method of claim 7, further comprising the step of providing an option to the supplier or demander to indicate that a respective electronic record should have a minimum score before being displayed as a match and thereby included on said supplier's or demander's match list.

9. The method of claim 1, further comprising the step of removing said supplier's and demander's contact information from said document records, thereby making the displayed match list of indexed electronic records to said supplier and demander anonymous.

10. The method of claim 9, further comprising the step of allowing a demander to gain access to said supplier's contact information.

11. The method of claim 10, wherein the step of allowing a demander to gain access to said supplier's contact information is facilitated by a payment by said demander.

12. The method of claim 1, further comprising the step of allowing the supplier or demander to provide feedback to the respective matched demander or supplier displayed on said match list.

13. The method of claim 12, wherein the feedback comprises whether a given supplier or demander is interested in the respective matched demander or supplier displayed on said match list.

14. The method of claim 1, wherein a geographic information contained in said supplier's profile is matched to a geographic information contained in said demander's profile, and wherein the step of matching a supplier indexed electronic record to a demander indexed electronic record utilizes geographic similarities contained in said indexed records.

15. The method of claim 1, wherein the step of matching a supplier indexed electronic record to a demander indexed electronic record is done in real-time.

16. A computer-implemented method for matching documents of a supplier and demander, the method comprising the steps of:

(a) inputting a document by a supplier, wherein the document includes the supplier's profile information and contact information;

(b) inputting a document by a demander, wherein the document includes the demander's profile information and contact information;

(c) extracting the supplier's and demander's profile information in said inputted documents to a commonly formatted document record for indexing purposes;

(d) indexing the supplier and demander commonly formatted document records, thereby creating an indexed electronic record of the initially inputted supplier and demander documents, wherein the step of indexing the supplier and demander commonly formatted document records to create an indexed electronic record comprises:
a human expert operator that categorizes new words or phrases in the document record with known words or phrases stored in a hierarchal database;
and
a hierarchal database that stores categories of known words or phrases and compares them to the known words or phrases in the document record;

(e) comparing a supplier indexed electronic record to a demander indexed electronic record, thereby generating a score for each electronic document relative to the electronic document it was compared with;

(f) matching a supplier indexed electronic record to a demander indexed electronic record, such that supplier and demander indexed electronic documents with the most common words or phrases contained therein are matched together, wherein the step of matching a supplier indexed electronic record to a demander indexed electronic record is scoring dependent, such that supplier and demander indexed electronic documents with the most common words or phrases contained therein receive the highest scores;

(g) displaying a match list, wherein the match list is comprised of matched indexed electronic records of a supplier or demander, wherein suppliers are matched to a given demander and demanders are matched to a given supplier;

(h) allowing a supplier or demander to view the contents of the indexed electronic records contained in said match list; and (i) removing said supplier's and demander's contact information from said document records, thereby making the displayed match list of indexed electronic records to said supplier and demander anonymous.

17. The method of claim 16, further comprising the step of providing an option to the supplier or demander to indicate that a respective electronic record should have a minimum score before being displayed as a match and thereby included on said supplier's or demander's match list.

18. The method claim 16, further comprising the step of adding said new words or phrases categorized by the human expert operator to a hierarchal database of words or phrases, thereby creating new hierarchal relationships in the hierarchal database.

19. The method of claim 16, further comprising the step of allowing a demander to gain access to said supplier's contact information.

20. The method of claim 16, further comprising the step of allowing the supplier or demander to provide feedback to the respective matched demander or supplier displayed on said match list.

21. The method of claim 20, wherein the feedback comprises whether a given supplier or demander is interested in the respective matched demander or supplier displayed on said match list.

22. The method of claim 16, wherein a geographic information contained in said supplier's profile is matched to a geographic information contained in said demander's profile, and wherein the step of matching a supplier indexed electronic record to a demander indexed electronic record utilizes geographic similarities contained in said indexed records.

23. A computer-implemented method for matching one or more candidates to one or more employers, the method comprising the steps of:
   (a) inputting a candidate's profile, wherein the profile also includes the candidate's contact information;
   (b) inputting an employer's profile, wherein the profile also includes the employer's contact information;
   (c) extracting the candidate's and employer's inputted profile information to a commonly formatted document record for indexing purposes;
   (d) indexing the candidate and employer commonly formatted document records, thereby creating an indexed electronic record of the initially inputted candidate and employer profiles;
   (e) comparing a candidate indexed electronic record to a employer indexed electronic record, thereby generating a score for each electronic document relative to the electronic document it was compared with;
   (f) matching a candidate indexed electronic record to a employer indexed electronic record, such that candidate and employer indexed electronic documents with the most common words or phrases contained therein are matched together, wherein the step of matching a candidate indexed electronic record to a employer indexed electronic record is scoring dependent, such that candidate and employer indexed electronic documents with the most common words or phrases contained therein receive the highest scores;
   (g) displaying a match list, wherein the match list is comprised of matched indexed electronic records of a candidate or employer, wherein candidates are matched to a given employer and employers are matched to a given candidate; and
   (h) allowing a candidate or employer to view the contents of the indexed electronic records contained in said match list.

24. The method of claim 23, further comprising the step of removing said candidate's and employer's contact information from said document records, thereby making the displayed match list of indexed electronic records to said candidate and employer anonymous.

25. The method of claim 23, wherein a geographic information contained in said candidate's profile is matched to a geographic information contained in said employer's profile, and wherein the step of matching a candidate indexed electronic record to a employer indexed electronic record utilizes geographic similarities contained in said indexed records.

* * * * *